US010369603B2

(12) United States Patent
Grant et al.

(10) Patent No.: US 10,369,603 B2
(45) Date of Patent: Aug. 6, 2019

(54) METHODS FOR DESTROYING LIQUID ORGANIC CONTAMINANTS IN A SMOLDERING COMBUSTION REACTION

(71) Applicant: Geosyntec Consultants, Inc., Boca Raton, FL (US)

(72) Inventors: Gavin Grant, Etabicoke (CA); Grant Scholes, Guelph (CA); David Major, Guelph (CA)

(73) Assignee: Geosyntec Consultants, Inc., Boca Raton, FL (US)

( * ) Notice: Subject to any disclaimer, the term of this patent is extended or adjusted under 35 U.S.C. 154(b) by 54 days.

(21) Appl. No.: 15/359,499

(22) Filed: Nov. 22, 2016

(65) Prior Publication Data

US 2017/0144204 A1    May 25, 2017

Related U.S. Application Data

(60) Provisional application No. 62/260,017, filed on Nov. 25, 2015.

(51) Int. Cl.
*B09C 1/00* (2006.01)
*B09C 1/06* (2006.01)
(Continued)

(52) U.S. Cl.
CPC .................. *B09C 1/06* (2013.01); *B09C 1/08* (2013.01); *E02D 3/11* (2013.01); *F23C 99/006* (2013.01);
(Continued)

(58) Field of Classification Search
CPC .. B09C 1/00; B09C 1/002; B09C 1/08; B09C 1/085; B09C 1/10; B09C 1/105;
(Continued)

(56) References Cited

U.S. PATENT DOCUMENTS 8,132,987 B2 * 3/2012 Gerhard .................... F23G 7/14
                                                                        405/128.85
9,168,409 B2 * 10/2015 Thomas .................. A62D 3/40
(Continued)

FOREIGN PATENT DOCUMENTS

WO    WO 2012/154402    11/2012    ............... B09C 1/06

OTHER PUBLICATIONS

Switzer et al., "Self-Sustaining Smoldering Combustion: A Novel Remediation Process for Non-Aqueous-Phase Liquids in Porous Media," Environmental Science and Technology, vol. 43, No. 15, pp. 5871-5877, 2009.
(Continued)

*Primary Examiner* — Benjamin F Fiorello
*Assistant Examiner* — Edwin J Toledo-Duran
(74) *Attorney, Agent, or Firm* — Sunstein Kann Murphy & Timbers LLP

(57) ABSTRACT

A method destroys organic liquid contaminants contained in a plurality of below-ground volumes by smoldering combustion. The method applies heat to at least a portion of a first one of the volumes of organic liquid and forces oxidant into the first volume of organic liquid so as to initiate self-sustaining smoldering combustion of the first volume of organic liquid. The method may terminate the heat applied to the first volume of organic liquid. Next, the method modulates the flow of the oxidant into the first volume of organic liquid so as to cause at least a portion of the first volume of organic liquid to migrate and come into contact with another one of the volumes of organic liquid, so as to propagate the smoldering combustion. In an alternative embodiment, the flow of the oxidant may be modulated to establish a substantially stationary combustion front.

10 Claims, 8 Drawing Sheets

(51) Int. Cl.
*B09C 1/08* (2006.01)
*E02D 3/11* (2006.01)
*F23C 99/00* (2006.01)
*F23G 7/05* (2006.01)
*F23G 7/14* (2006.01)

(52) U.S. Cl.
CPC ............... *F23G 7/05* (2013.01); *F23G 7/14* (2013.01); *B09C 2101/00* (2013.01)

(58) Field of Classification Search
CPC ....... B09C 2101/00; B09C 1/06; B09C 1/062; B09C 1/065; B09C 1/067
USPC ... 405/128.5, 128.55, 128.6, 128.65, 128.45, 405/128.1, 128.7, 128.75; 588/320, 405
See application file for complete search history.

(56) References Cited

U.S. PATENT DOCUMENTS

| | | | |
|---|---|---|---|
| 9,259,770 B2 * | 2/2016 | Thomas | F23C 99/006 |
| 2002/0117434 A1 * | 8/2002 | Naftz | B09C 1/002 210/170.07 |
| 2003/0155309 A1 * | 8/2003 | Schindler | B09C 1/002 210/747.8 |
| 2005/0011830 A1 * | 1/2005 | Lessard | B09C 1/002 210/610 |
| 2005/0067356 A1 * | 3/2005 | Bowman | B09C 1/002 405/128.5 |
| 2012/0272878 A1 | 11/2012 | Grant et al. | 110/346 |
| 2014/0241806 A1 * | 8/2014 | Rockwell | B09C 1/06 405/128.6 |
| 2014/0255099 A1 * | 9/2014 | Reynolds | B09C 1/062 405/128.55 |

OTHER PUBLICATIONS

International Searching Authority, International Search Report—International Application No. PCT/US2016/063418, dated Feb. 23, 2017, together with the Written Opinion of the International Searching Authority, 13 pages.

* cited by examiner

METHODS FOR DESTROYING LIQUID ORGANIC CONTAMINANTS IN A SMOLDERING COMBUSTION REACTION

CROSS-REFERENCE TO RELATED APPLICATIONS

This application claims priority from U.S. provisional patent application Ser. No. 62/260,017, filed on Nov. 25, 2015, entitled, "Methods for Destroying Liquid Organic Contaminants in a Smoldering Combustion Reaction," and naming Gavin Grant, Grant Scholes and David Major as inventors, the disclosure of which is incorporated herein, in its entirety, by reference.

TECHNICAL FIELD

The present invention relates to methods for destroying liquid organic contaminants through smoldering combustion, and more particularly to methods of manipulating a smoldering combustion reaction to destroy liquid organic contaminants.

BACKGROUND ART

Recent advances in the field of contaminant hydrogeology have shown that smoldering combustion can be used to treat soils contaminated with organic wastes. This approach is commercially available as the Self-sustaining Treatment for Active Remediation (STAR) technology and is the subject of U.S. Pat. No. 8,132,987. Smoldering combustion requires a short duration energy input, and the addition of an oxidant (e.g., oxygen, air, etc.) to initiate and sustain the smoldering combustion reaction. An example of a smoldering combustion reaction is that of a burning charcoal briquette. Smoldering combustion is only possible in the presence of a fuel source and a porous matrix. For the case of a charcoal briquette, the charcoal is both the fuel and the porous matrix; whereas for the STAR process, the fuel is the organic contaminant and the porous matrix is the subterranean volume of soil.

There are numerous methodologies for the remediation of contaminated soils, including a group of technologies that use thermal processes to remove or destroy contaminants through endothermic processes (net energy consuming) such as pyrolysis and volatilization. These thermal remedies are often prohibitively costly due to the requirement that large amounts of heat/energy need to be applied to the soils. The STAR technology benefits from the fact that smoldering combustion is an exothermic reaction (net energy producing) converting carbon compounds and an oxidant to carbon dioxide, water and energy. Smoldering combustion reactions can be established with only a short duration, low-input of localized energy and operated in a self-sustaining manner; in essence, the energy for the destruction of contaminants in STAR primarily comes from the inherent energy within the contaminants themselves.

SUMMARY OF THE EMBODIMENTS

In accordance with one embodiment of the invention, a method destroys organic liquid contaminants contained in a plurality of below-ground volumes by smoldering combustion. The method applies heat to at least a portion of a first one of the volumes of organic liquid and forces oxidant into the first volume of organic liquid so as to initiate self-sustaining smoldering combustion of the first volume of organic liquid. The method may terminate the heat applied to the first volume of organic liquid. Next, the method may modulate the flow of the oxidant into the first volume of organic liquid so as to cause at least a portion of the first volume of organic liquid to migrate and come into contact with another one of the volumes of organic liquid, so as to propagate the smoldering combustion.

Among other things, the method may cause propagation of the combustion away from a point of ignition of the combustion. The method may force oxidant through the first volume of organic liquid by injecting air into the first volume of organic liquid through an injection port. The method may apply where the ground is natural or made ground.

In accordance with another embodiment, a method destroys organic liquid contaminants contained in a large below-ground volume by smoldering combustion with a single oxidant source. The method applies heat to at least a portion of the volume containing the organic liquid. The method also forces oxidant into the volume containing the organic liquid so as to initiate self-sustaining smoldering combustion of the organic liquid. The method may terminate the heat applied to the volume containing the organic liquid. Next, the method modulates flow of the oxidant into the volume containing the organic liquid in a manner to establish a substantially stationary combustion front. The substantially stationary combustion front may cause destruction of the organic liquid, by smoldering combustion, to occur at a rate approximating a rate of influx of the organic liquid into the smoldering combustion.

In accordance with some other embodiments, a method combines organic liquid contaminants contained in a plurality of below-ground volumes for destruction by smoldering combustion. The method locates a first one of the volumes of organic liquid. The method forces oxidant into the ground so as to cause the first volume of organic liquid to migrate away from a point of oxidant injection; and forms a combined volume of organic liquid by contacting the first volume of organic liquid with a second one of the volumes of organic liquid. The method may apply heat to at least a portion of the combined volume of organic liquid. In some embodiments, the heat applied to the mixture may be from a convective heating source coupled to the ground. Next, the method may terminate the heat applied to the combined volume of organic liquid so as to initiate a self-sustaining smoldering combustion reaction of the combined volume of organic liquid.

In general terms, in each of the above described embodiments, it may be desired to promote/maintain self-sustained smoldering combustion as a method of destroying liquid organic waste present in soil depending on the nature and extent of the liquid organic waste.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
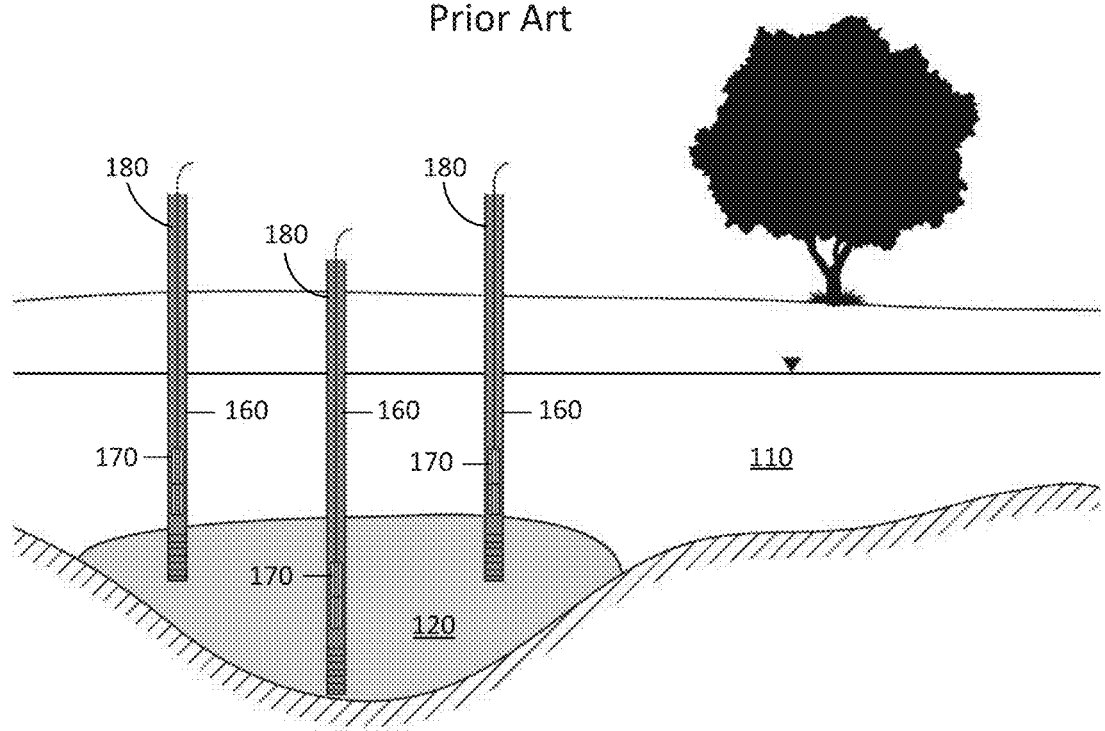
FIG. 1 schematically shows a cross-sectional view of a prior art method using multiple wells for destroying contaminants in a large liquid pool by a smoldering combustion reaction.

Definitions. As used in this description and the accompanying claims, the following terms shall have the meanings indicated, unless the context otherwise requires.

The term "smoldering combustion" refers to the act or process of burning without flame; a rapid oxidation accompanied by heat and light but not flame. In smoldering combustion, the combustion occurs on the surface of the fuel (i.e., not in the gas phase above the fuel as with a flame), in this case, the organic waste.

Smoldering refers to combustion of a material at the surface of the solid or liquid material itself. For example, when a combustible material (e.g., tobacco) is compacted to form a porous solid (e.g., a cigarette) and is ignited, the oxidant (oxygen) diffuses into the surface of the material and the combustion proceeds at the surface of the tobacco leaf fragment. Smoldering is referred to as a heterogeneous combustion reaction because the oxidant (gas) and the fuel (liquid or solid) are distinct phases. This is in contrast to flaming combustion which is a homogeneous reaction occurring in a single (gas) phase.

In some embodiments of the present invention, the contaminated soil serves as a scaffold to entrap the organic liquid (i.e., contaminant) in an environment that facilitates smoldering combustion. Smoldering is the only type of combustion reaction that can propagate through a soil contaminated with an organic liquid (i.e., flames are not capable of propagating through such a system). Smoldering combustion is maintained through the efficient recycling of energy within the system. First, the organic liquid is combusted, giving off heat energy which is retained by the soil. Second, the retained heat energy is re-radiated or returned to the system from the soil or transferred through the mixture by moving fluids (e.g., oxidant gas) to pre-heat the organic liquid that has yet to be combusted; thereby providing it with the heat energy required for combustion to occur. Thus, following a short duration energy input to initiate the process, smoldering combustion is self-sustaining (i.e., it uses the energy of the combusting organic liquids, along with a supply of oxidant, to maintain the reaction).

The heat energy that is re-radiated or returned to the organic liquid has a second effect in addition to providing the un-combusted liquid with the energy required for combustion to occur. That is, the heat energy increases the temperature of the organic liquid which reduces the viscosity and increases the mobility of the organic liquid. Under certain operating conditions (i.e., oxidant flow rates), the combustion reaction is capable of propagating away from the point of ignition through a continuous or semi-continuous volume of contaminated soil. Under other operating conditions, the heat-reduced viscosity of the organic liquid can be used to promote the movement of the organic liquid towards or away from the combustion reaction.

The term "organic liquid" refers to an organic material that can flow as a liquid or has plasticity as goo containing organic carbon compounds and includes materials that are partially liquid such as a hydrocarbon sludge, slurries or emulsions.

The term "self-sustaining" refers to reaction conditions wherein smoldering combustion propagates through the organic matter without the application of external energy; that is, when the already smoldering organic waste produces sufficient heat to elevate the temperature in the adjacent matter to its combustion point. Conditions may be self-sustaining even if the application of heat is initially required to initiate smoldering combustion.

The term "ignition" refers to the process of initiating combustion.

The term "conductive heating" refers to the transfer of thermal energy by direct physical contact.

The term "convective heating" refers to the transfer of thermal energy by the movement of fluids.

The term "radiative heating" refers to the transfer of thermal energy by electromagnetic radiation.

The term "combustion front" refers to the location of the smoldering combustion reaction.

The term "porous matrix" means a synthetic or natural solid material having pores (open spaces) and wherein the solid material may be a single piece having pores or a collection of granular solids having pores there between. Examples of materials suitable of comprising the porous matrices of illustrative embodiments of the present invention include sand, soils, silt, loam, fill, cobbles, gravel, glass beads, wood chips, zeolite, crushed stone, ceramic chips or beads, charcoal, coal, drill cuttings and combinations thereof.

The term "impoundment" refers to aggregation of an organic liquid in a vessel, or in a pile on the ground, or in a below ground-level cavity. Similarly, an "impoundment" of a mixture of an organic liquid with a matrix is an aggregation of the mixture in a vessel, or in a pile on the ground, or in a below ground-level cavity.

The term "volume" refers to a below-ground formation that contains an organic liquid contaminant. Two formations may be connected to one another while still constituting distinct "volumes" within the meaning of this definition.

Illustrative embodiments of the present invention are based on the surprising discovery that organic liquids can be smoldered under different operating regimes; that is, different externally applied operating conditions to carry out a smoldering combustion reaction that promote the destruction of an organic liquid under different circumstances than may be found in the environment.

U.S. Pat. No. 8,132,987 ("Gerhard") teaches a method for remediating contaminated land by initiating a smoldering combustion reaction at a point and propagating that reaction through a volume of contaminated soil from that point through the injection of an oxidant (e.g., air). The method assumes that propagation is desirable and that the fuel source for the smoldering reaction (i.e., the combustible material) is sufficiently continuous that the reaction can propagate through the land to be remediated.

Gerhard teaches smoldering under a single operational regime—propagation through a continuous volume of contaminated soil—but the degree of contamination in a field setting can vary significantly from location to location as a result of soil heterogeneities, the physical and chemical properties of the contaminant, the magnitude and duration of the release that led to the contamination of soils, and various other factors.

Figure 2:
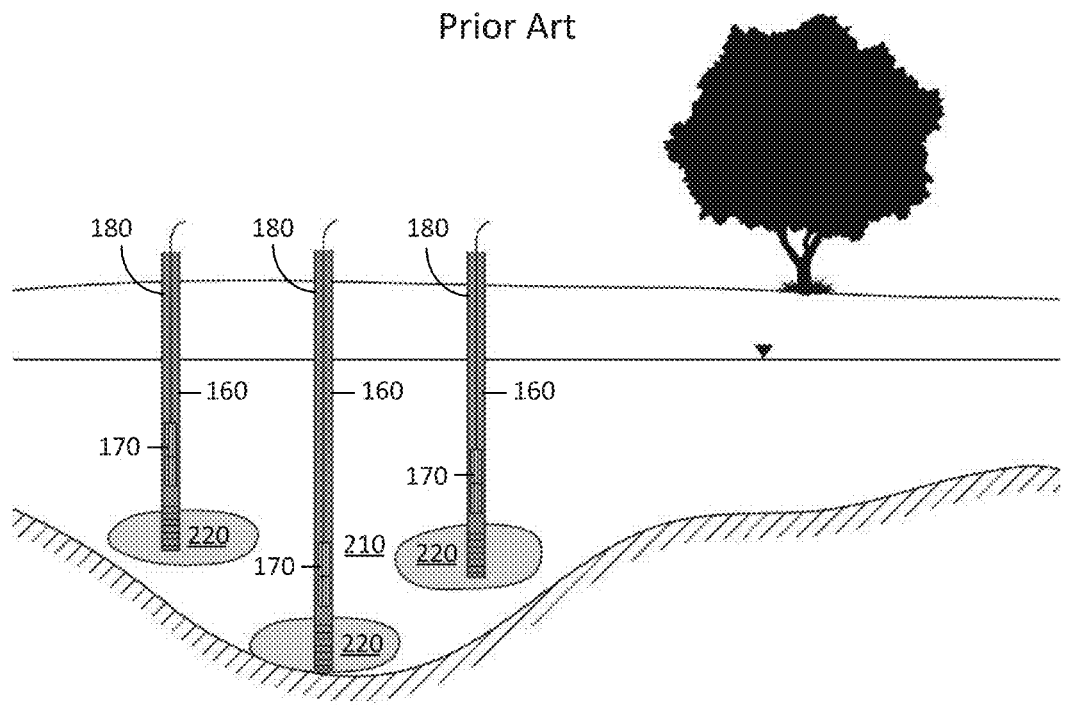
FIG. 2 schematically shows a cross-sectional view of a prior art method using multiple wells for destroying contaminants in a heterogeneous liquid pool by a smoldering combustion reaction.

In certain situations, this method of Gerhard encountered problems. These problems with smoldering organic liquid contaminants in soil can occur when dealing with large organic liquid deposits and/or heterogeneous organic liquid deposits. In one extreme, the degree of contamination may be large, consisting of high saturation levels of contaminants 120 within the pore space of the soil 110 and extending over large volumes of soil 110 as depicted in FIG. 1. At the other extreme, the degree of contamination 220 may be sparse, characterized by pockets of contamination 220 separated by relatively clean or completely clean soils 210 as depicted in FIG. 2. In either extreme, application of the method described in Gerhard will require the use of many points of ignition 170 and many sources of oxidant 160 to affect treatment of the contaminated soil. In the former extreme, many ignition 170/oxidant supply 160 locations are required to access the large volume of high saturation contaminated soils 120 as shown in FIG. 1. In the latter extreme, each pocket of contamination 220 must be targeted separately, as shown in FIG. 2, since the smoldering combustion process requires a relatively continuous volume of contamination (220) in order to propagate.

The cost of installing multiple ignition points 170 and maintaining multiple oxidant supply locations 160 can be high and a lower cost alternative may be desired. To address the various types of contamination (high saturation, large volumes of contaminated soils 120 versus sparse distributions of contaminated soils 220) some embodiments of the invention may initiate and maintain a smoldering combustion reaction at different oxidant injection rates (low flow versus high flow) while remaining within the bounds prescribed by the smoldering combustion reaction. That is, in a location where the degree of contamination is large (i.e., high saturation, large volumes of contaminated soils 120), it may be desirable to initiate a smoldering combustion reaction, but maintain it using an oxidant injection rate at the low end of viable injection rates to minimize propagation, encourage contaminant movement towards the point of ignition, and maximize contaminant 120 mass destruction at a single location for as long as practical, and in so doing, reduce the number of ignition points 170 and/or oxidant delivery points 160 to affect treatment of the contaminated soil 120. Collectively, the ignition point(s) 170 and the oxidant delivery point(s) 160 may be referred to as a well 180.

Alternatively, at a location where the degree of contamination 220 is small and/or sporadic, it may be advantageous to initiate a smoldering combustion reaction using an oxidant injection rate at the high end of viable injection rates to promote forced contaminant 220 movement away from the point of ignition 170 via the pressure of the injected oxidant. The joining of distinct bodies of contamination 220 creates or enhances a continuous contaminant 220, and maximizes the extent the smoldering combustion reaction can propagate, and in so doing, reduces the number of ignition points 170 and/or oxidant delivery points 160 used to affect treatment of the contaminated soil 220. Some embodiments of the invention apply to in situ contamination. Alternatively, or additionally, some embodiments of the invention apply to ex situ contamination. Some embodiments of the invention may be used to destroy Dense Non-Aqueous Phase Liquid contamination and additionally, or alternatively, Light Non-Aqueous Phase Liquid contamination.

Illustrative embodiments of the invention provide a method of manipulating a smoldering combustion reaction to achieve desirable outcomes through soils containing liquid organic contaminants encountered in practice. The smoldering combustion operating conditions can be modified to allow for destruction of an organic liquid that may be found in the environment. In some embodiments, smoldering combustion of organic liquid contaminant deposits may take place with a single well 180. Although some embodiments of the invention are discussed with regards to a single well 180, not all embodiments are limited to a single well 180, nor are embodiments required to reduce the number of wells 180 used by the prior art. Indeed, some embodiments of the invention may use just as many or more wells 180 than prior art methods.

Figure 3:
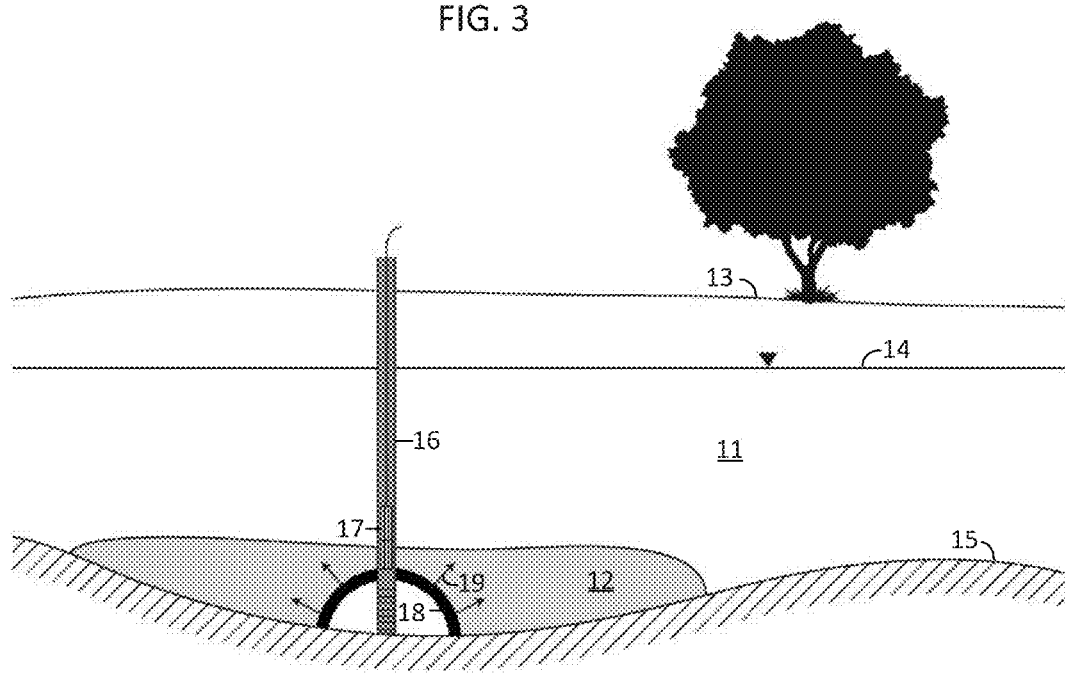
FIG. 3 schematically shows a cross-sectional view of a smoldering combustion reaction initiated and propagating through a continuous contaminated soil in accordance with illustrative embodiments of the invention.

FIG. 3 illustrates a volume of natural soils 11 which has been contaminated by an organic liquid contaminant 12 (also referred to as organic liquid 12). The organic liquid 12 may have found its way into the soil 11 by being previously disposed of. For example, the organic liquid 12 may have been poured onto a surface 13 of the soil 11 when disposed, or may be the result of an accidental spillage on the surface 13 or within the soil 11 from an underground storage container. As shown in FIG. 3, the organic liquid 12 has permeated down through the soil 11 below a water table 14 and has come to rest on an impermeable boundary 15 such as clay or competent bedrock. It will be understood that the distribution, shape and volume of the organic liquid 12 may depend upon a number of factors including the volume of liquid released, the physical fluid properties of the liquid, and the spatial distribution of soil or rock permeability in the region of impacted soils 11. It should be further understood that the shown location and distribution of the organic liquid 12 within the soil 11 relative to the surface 13, the water table 14 or any impermeable boundary 15 in the figures are merely illustrative, and not intended to limit illustrative embodiments of the invention.

Destruction of the organic liquid 12 is brought about through smoldering combustion, which may be initiated by applying an oxidant and sufficient heat to the contaminated soil. Oxidant delivery may be accomplished by injecting the oxidant into the soil 11 via a well 16—in one embodiment the oxidant injection is done by forcing air into the ground and through the well 16. In some embodiments, the well 16 may be composed of carbon or stainless steel and may consist of a screened section through which oxidant can enter the soils 11. Heat may be initially supplied externally through the use of an in-well heater 17, a surface heater, a co-located subsurface heater or other means. In some embodiments, the location of heat addition may coincide with the location of oxidant delivery. It should be understood that the well 16 is not necessarily drawn to scale, and that the location of the heater 17 and/or oxidant source with relation to the well may be different than shown. The mode of heat addition and location of the heater 17 are not intended to limit illustrative embodiments of the present invention. Following ignition and the establishment of a combustion front 18, the heater 17 is terminated and smoldering combustion propagates 19 in a self-sustaining manner.

Figure 4:
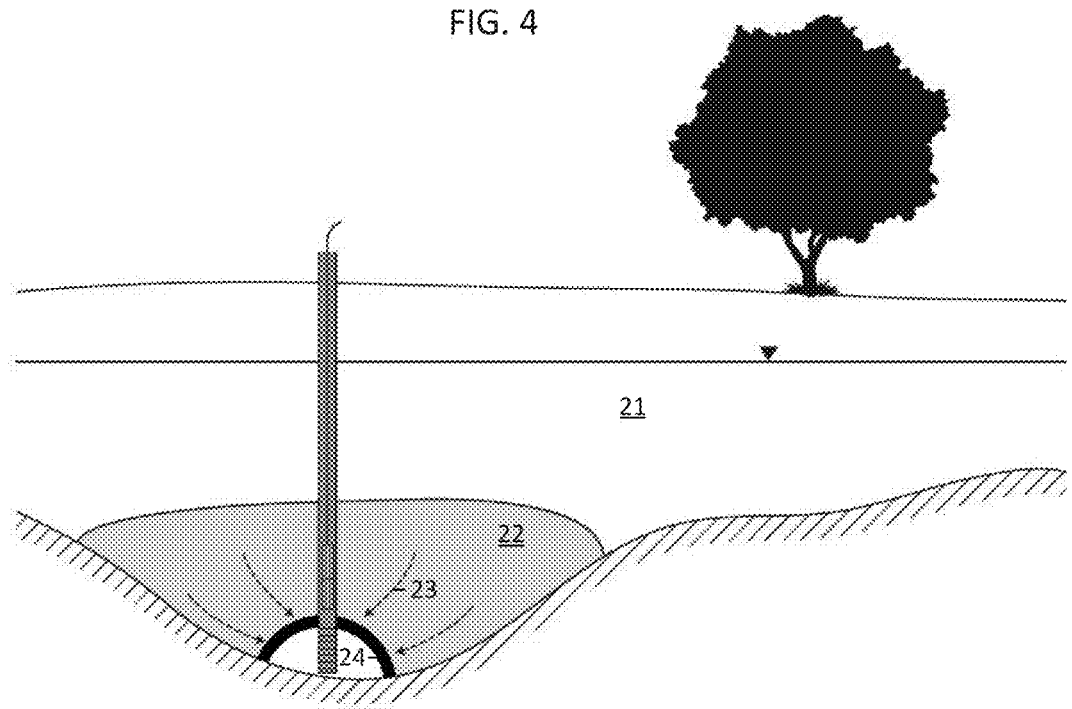
FIG. 4 schematically shows a cross-sectional view of a smoldering combustion reaction initiated and maintained in a fixed position whereby the liquid organic contaminant is allowed to migrate towards the combustion front at a rate that matches the mass-destruction rate of the organic liquid within the combustion reaction.

FIG. 4 illustrates a volume of soils 21 which has been contaminated by an organic liquid 22 in a similar manner to that described for FIG. 3. Destruction of the organic liquid 22 is again brought about through smoldering combustion which may be initiated by applying an oxidant and sufficient heat to the contaminated soil 21; however, in this scenario, the oxidant addition rate may be slower than that shown in FIG. 3 (all other conditions being equal). A person having ordinary skill in the art will understand that when the oxidant addition rate is slower, the distribution of the heat of the combustion reaction may be localized to the organic liquid 22 near the oxidant delivery system (and/or the heat delivery system). It is known that the viscosity of a fluid is temperature dependent. For a liquid, viscosity decreases with higher temperature. Therefore, the increase in heat caused by the combustion reaction will cause the heated organic liquid 22 to become less viscous (in other words it becomes more fluid) than other surrounding fluid. As a result, the heat of the combustion reaction lowers the viscosity and enhances the mobility of the heated organic liquid 22, and under the force of gravity causes an influx 23 of the unheated and/or less heated organic liquid 22 towards the combustion front 24. If oxidant flow rates are small, the mass destruction rate of the organic liquid 22 is reduced and the enhanced mobility of the organic liquid 22 results in an influx 23 of the organic liquid 22 to the combustion front 24, causing the combustion front 24 to remain substantially stationary. Thus, large volumes of organic liquid 22 may be combusted at a single location following a single ignition event.

Illustrative embodiments of the invention provide a method for initiating a smoldering combustion reaction and maintaining it in a steady state whereby destruction of the organic liquid 22 within the combustion reaction is approximately equal to the influx 23 of organic liquid 22 towards the combustion front 24. Operating conditions (i.e., oxidant flow rates) can be established whereby the rate of mass destruction is matched, or substantially matched, by the rate of organic liquid 22 influx 23. The operating conditions required to establish a long-term, stationary or substantially stationary combustion front 24 may be location specific and a function of the permeability of the soil to oxidant injection, the temperature of the combusting organic liquid 22, the viscosity of the organic liquid 22 as a function of temperature, the driving force (i.e., gravitation and capillary forces) acting upon the organic liquid 22, the pressure of the injected oxidant, and various other factors. In this embodiment, the oxidant injection rate may be at the low end of the spectrum of injection rates that can be used to maintain a smoldering combustion reaction in this environment.

Figure 5:
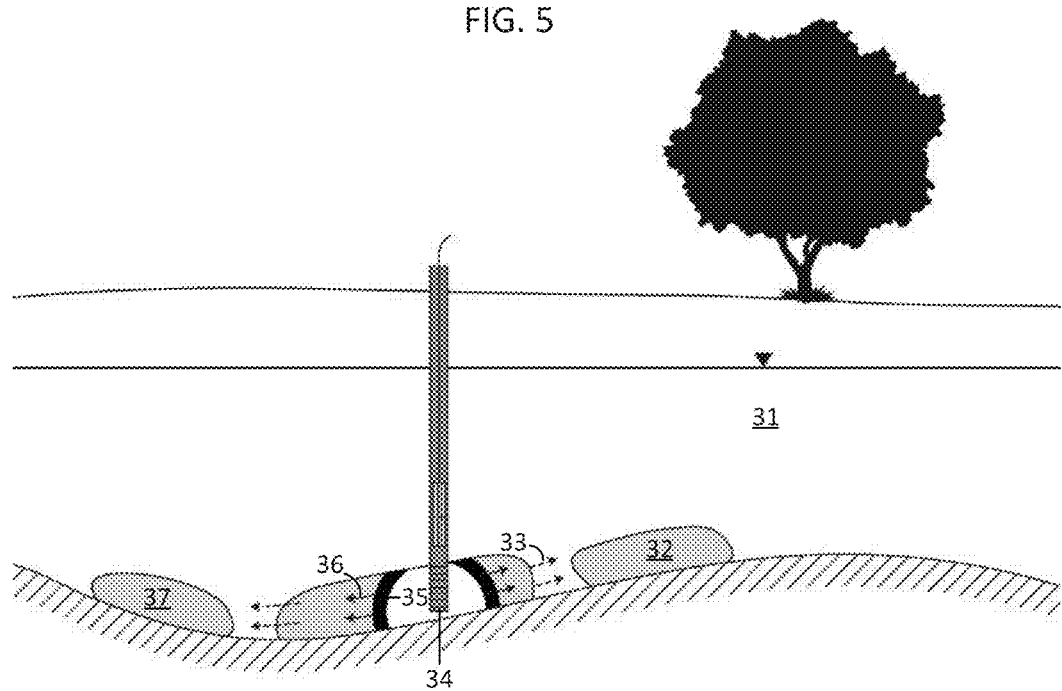
FIG. 5 schematically shows a cross-sectional view of a smoldering combustion reaction initiated and maintained to promote the movement of the organic liquid away from the point of ignition so as to connect distinct bodies of contamination and create a continuous volume of contaminated soils in accordance with illustrative embodiments of the invention.

FIG. 5 illustrates a volume of natural soils 31 which have been contaminated by an organic liquid 32, but in this scenario the organic liquid 32 is present in distinct bodies separated by clean or less-contaminated soils 31. Destruction of the organic liquid 32 may again be brought about through smoldering combustion which is initiated by applying an oxidant and sufficient heat to the contaminated soil 37; however, because smoldering combustion propagation uses the internal thermal energy of the contaminants, the propagation distance may be limited by the extent of the continuous volume of contaminated soils 37. This volume of contaminated soil 37 may be manipulated and/or extended by increasing the oxidant flow rate relative to the scenario shown in FIG. 3 (all other conditions being equal). The physical force of the oxidant flow rate may be sufficient to cause the organic liquid 32 to migrate 33 away from the point of ignition 34 as the combustion front 35 propagates 36 such that one distinct body of organic liquid 32 coalesces with the next distinct body of organic liquid 32 to create a larger, continuous volume of contaminated soil 37 through which the combustion front 35 can propagate 36. For convenience, both the point of ignition 34 and the oxidant supply point 34 share the same reference numeral. It should be understood that while both the point of ignition 34 and the oxidant supply point 34 may be shown in the figures as the same reference numeral, illustrative embodiments are not intended to be limited to the configuration shown in the figures. In some embodiments, the oxidant supply point 34 and the point of ignition 34 may be located separately.

Illustrative embodiments provide a method for initiating a smoldering combustion reaction and maintaining it in such a manner as to promote the movement of the organic liquid 32 away from the point of ignition 34 so as to connect distinct bodies of contamination 32; thus creating a continuous path of contaminated soils 37 for the propagation of the smoldering combustion reaction 35 that did not previously exist. In this embodiment, the oxidant injection rate may be at the high end of the spectrum of injection rates that can be used to maintain a smoldering combustion reaction in this environment, and may be sufficient to force the migration 33 of the contaminant away from the oxidant supply point 34.

If oxidant flow rates are large, the mass destruction rate of the organic liquid 32 may be increased but the organic liquid 32 may be heated across a larger volume (resulting in a larger volume of lower viscosity, more mobile material) and can be pushed under the force of the injected oxidant through regions of clean soil to connect one body of organic liquids 32 to another; thus creating a large, continuous volume of contaminated soils that did not exist prior to the initiation and manipulation of the combustion reaction. Similar to the operating conditions required to establish a stationary combustion front 24, the operating conditions that may be used to promote the joining of distinct bodies of organic liquids 32 during the propagation 36 of a smoldering combustion front 35 may be location specific and a function of the permeability of the soil to oxidant injection, the temperature of the combusting organic liquid 32, the viscosity of the organic liquid 32 as a function of temperature, the driving force (i.e., gravitation and capillary forces) acting upon the organic liquid 32, the pressure of the injected oxidant, and various other factors.

In summary, low oxidant flow rates where heat transfer away from the point of ignition dominates may result in low organic liquid 22 destruction rates and the establishment of a stationary combustion front 24 that promotes the long-term destruction of organic liquid 22 at a single location brought about by a single ignition event. Moderate oxidant flow rates may result in the balancing of heat transfer and organic liquid destruction in a manner that promotes propagation of a combustion reaction through a continuous volume of contaminated soils. High oxidant flow rates may increase organic liquid destruction rates and promote the migration 33 of organic liquids 32 away from the point of ignition 34 from one distinct body of organic liquid 32 to the next. This may create a continuous volume of contaminated soils, through which a combustion reaction may propagate 36, that otherwise would not exist.

The different operation conditions described above can be used to promote organic liquid destruction under different smoldering combustion regimes. Selection of the smoldering combustion regime may depend on location-specific conditions related to the degree and extent of contamination. Although the previously discussed embodiments show either a low oxidant flow rate or a high oxidant flow rate, these are not intended to limit illustrative embodiments of the invention to a single flow rate. Nor are these examples intended to limit illustrative embodiments of the invention to a consistent or uniform flow rate. Illustrative embodiments of the invention may having changing flow rates, and what started as a low oxidant flow rate may be increased to a high oxidant flow rate, and vice-versa. For example, a high flow rate may be used to create a continuous volume of contaminated soils, and a low flow rate may then be used to create a substantially stationary combustion front.

Figure 6:
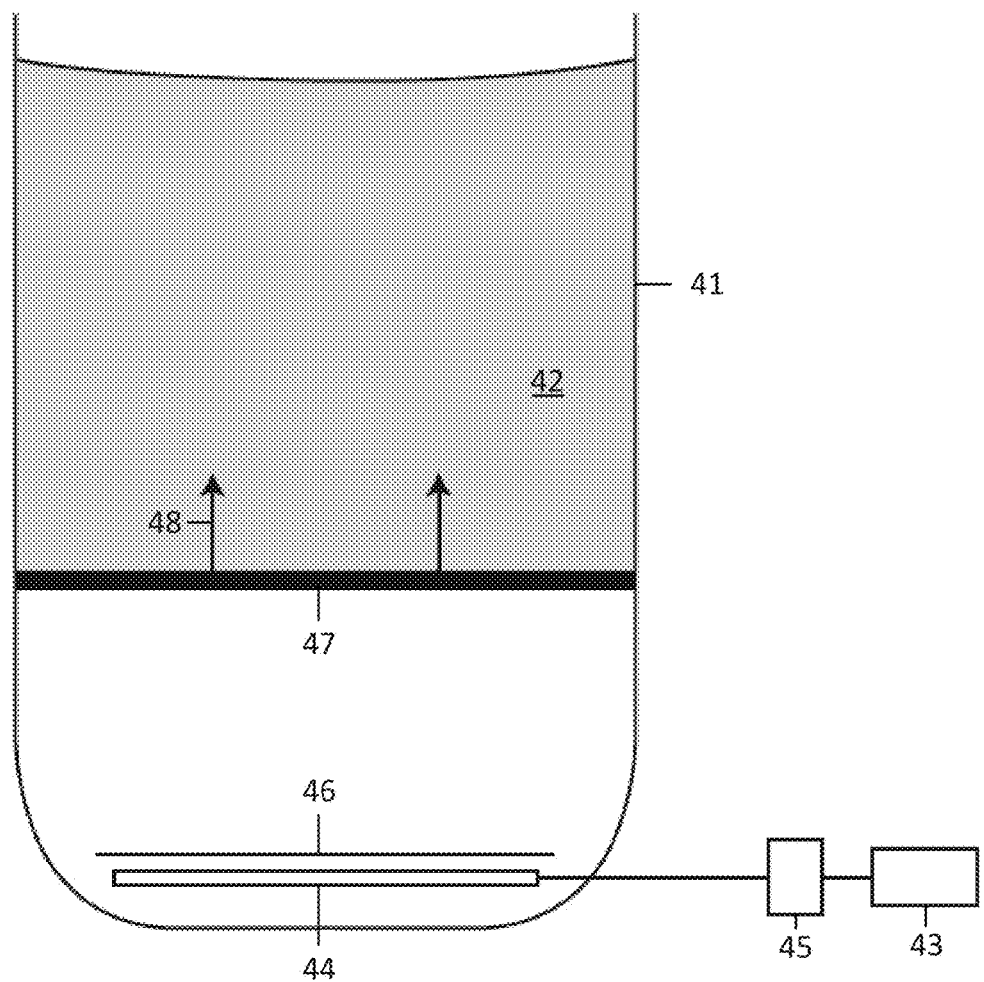
FIG. 6 schematically shows a cross-sectional view of a smoldering combustion reaction initiated and propagating through a continuous contaminated soil or organic liquid/porous matrix mixture in an ex situ reaction vessel in accordance with illustrative embodiments of the invention.
Figure 7:
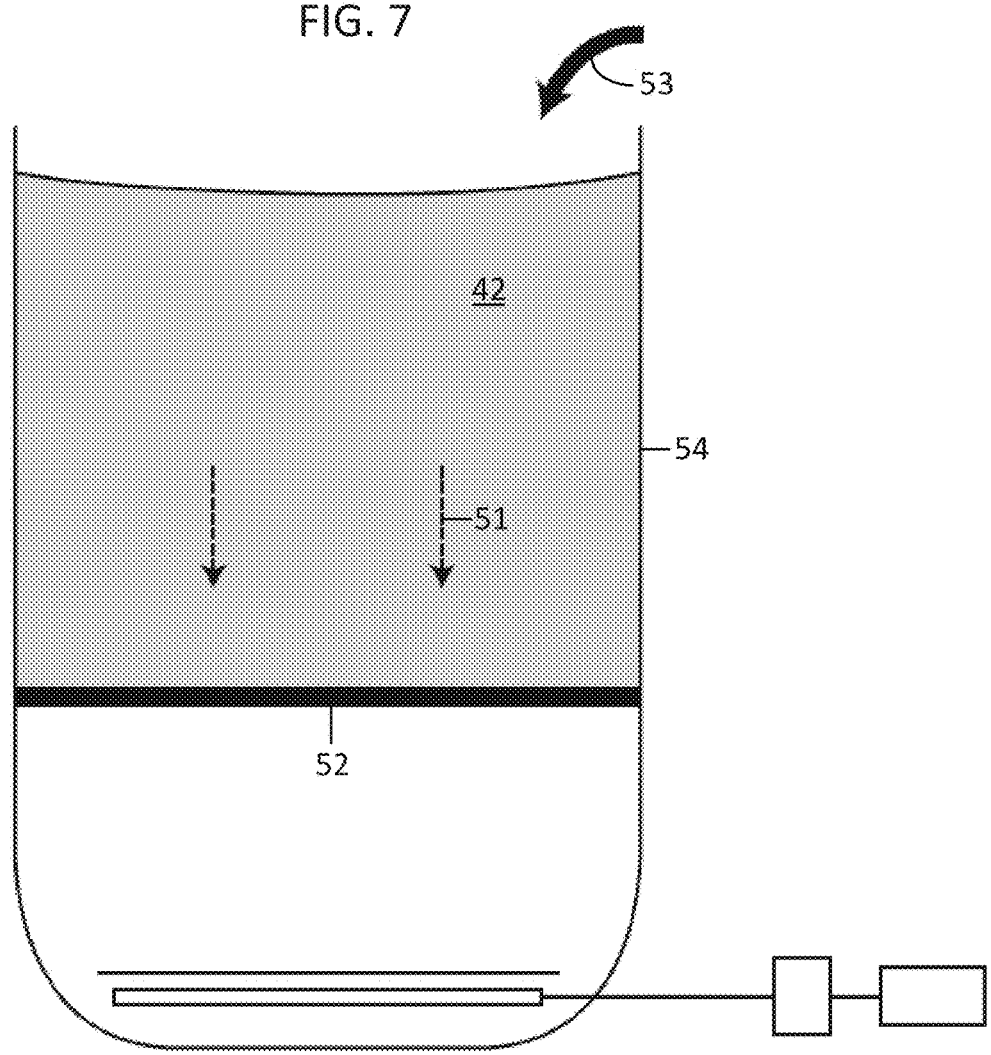
FIG. 7 schematically shows a cross-sectional view of a smoldering combustion reaction initiated and maintained in a substantially stationary position by causing destruction of the organic liquid to occur at a rate approximating a rate of influx of the organic liquid into the smoldering combustion within the combustion reaction in an ex situ reaction vessel in accordance with illustrative embodiments of the invention.
Figure 8:
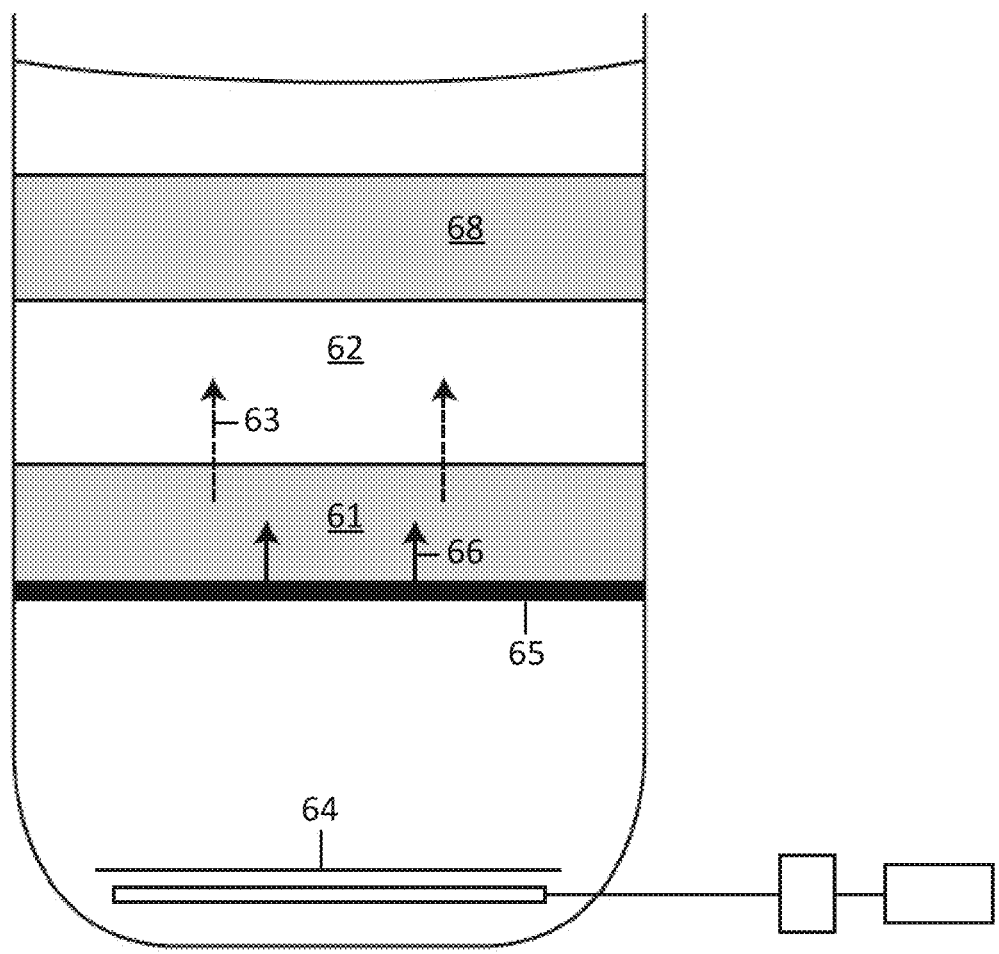
FIG. 8 schematically shows a cross-sectional view of a smoldering combustion reaction initiated and maintained in such a manner as to promote the movement of the organic liquid away from the point of ignition so as to connect distinct bodies of contamination and create a continuous volume of contaminated soils in an ex situ reaction vessel in accordance with illustrative embodiments of the invention.

FIG. 6 schematically shows a cross-sectional view of a smoldering combustion reaction initiated and propagating through a continuous contaminated soil 42 or organic liquid/porous matrix mixture 42 in an ex situ reaction vessel in accordance with illustrative embodiments of the invention. Specifically, FIG. 6 illustrates an impoundment 41, according to illustrative embodiments of the invention, into which a soil 42 contaminated with an organic liquid or a liquid organic waste/porous matrix mixture 42 are added to carry out a smoldering combustion reaction for the destruction of the organic liquid. The dimensions of the impoundment 41, the materials of construction, the types of ancillary equipment (mixers, heaters, oxidant injection devices) used in the process, the methods for loading and unloading the impoundment, the methods for mixing the liquid organic waste and porous matrix, and the orientation of the impoundment 41 are not intended to limit illustrative embodiments of the invention. FIGS. 6 through 8 are provided as "ex situ" examples as a counter point to the methods described above for "in situ" organic liquid destruction as depicted in FIGS. 3 through 5.

As shown in FIG. 6, the organic liquid is present in the soil 42 as a contaminant or has been admixed with a porous matrix 42 as a means of destroying the organic liquid in a smoldering combustion reaction. Destruction of the organic liquid is brought about through smoldering combustion which is initiated by applying an oxidant and sufficient heat to the contaminated soil. Oxidant delivery is accomplished by injecting the oxidant into the soil 42 or organic liquid/porous matrix mixture 42 from an oxidant source 43 through an oxidant supply port 44. The air supply port 44 may comprise a single aperture into the impoundment 41 or may comprise a manifold with multiple apertures placed within the impoundment 41. Two different heating sources are depicted, which may be used either alone or in combination. For example, a heating source 45 may be placed in-line with the supplied oxidant to supply convective heat to the admixture. Convective heating sources may also be positioned within the impoundment 41 or within the walls of the impoundment 41. Additionally, an internal heating source 46 may be placed within the impoundment 41 to supply conductive or radiative heat for ignition and maintenance of smoldering. As shown in FIG. 6, the internal conductive/radiative heating source 46 may be placed towards the bottom of the impoundment 41 to propagate a "bottom-to-top" combustion front 47. Additional conductive heat sources 46 may be placed throughout the interior walls of the impoundment 41 to initiate combustion at varying levels within the admixture.

Following ignition and the establishment of a combustion front 47 the heater or heaters 45 and 46 is terminated and smoldering combustion may proceed in a self-sustaining manner. FIG. 6 is analogous to the method depicted in FIG. 3, where the oxidant injection rate is selected to promote the propagation 48 of the combustion front 47 through the contaminated soil 42 or organic liquid/porous matrix mixture 42 throughout the impoundment 41.

FIG. 7 schematically shows a cross-sectional view of a smoldering combustion reaction initiated and maintained in a substantially stationary position by causing destruction of the organic liquid to occur at a rate approximating a rate of influx of the organic liquid into the smoldering combustion within the combustion reaction in an ex situ reaction vessel, in accordance with illustrative embodiments of the invention. FIG. 7 is analogous to FIG. 4 except that the smoldering combustion reaction is conducted in an impoundment 54. The material to be combusted may be a contaminated soil 42 or a mixture of an organic liquid and a porous matrix 42. Destruction of the organic liquid is again brought about through smoldering combustion which may be initiated by applying an oxidant and sufficient heat to the contaminated soil 42; however, in this scenario, the oxidant addition rate is slower than that shown in FIG. 6 (all other conditions being equal) such that the heat of the combustion reaction lowers the viscosity and enhances the mobility of the organic liquid, and under the force of gravity migrates 51 towards the combustion front 52 at a rate that matches, or approximates, the mass destruction rate of the organic liquid. The combustion front 52 remains substantially stationary, as large volumes of organic liquid are combusted at a single location following a single ignition event. Additional volumes of organic liquid, contaminated soil 42, or a mixture of organic liquid and porous matrix 42 can be added 53 to the impoundment 54 to increase the amount of organic liquid that is destroyed through a single ignition event and at a single combustion front 52.

FIG. 8 illustrates a volume of contaminated soils or a mixture including an organic liquid and a porous matrix 61 but in this scenario the organic liquid is present in distinct bodies separated by clean or less-contaminated soil 62 or porous matrix material 62. Destruction of the organic liquid is again brought about through smoldering combustion which is initiated by applying an oxidant and sufficient heat to the contaminated soil 61; however, the propagation distance is limited by the extent of the continuous volume of contaminated soils 61 or organic liquid/porous matrix mixture 61. This volume may be extended by increasing the oxidant flow rate relative to the scenario shown in FIG. 6 (all other conditions being equal), such that the organic liquid contained in the volume of contaminated soils 61 or the mixture of organic liquid/porous matrix 61 migrates 63 away from the point of ignition 64 as the combustion front 65 propagates 66. The organic liquid in the contaminated soil 61 or the organic liquid/porous matrix mixture 61 in one region coalesces with the organic liquid in the contaminated soil 61 or the organic liquid/porous matrix mixture 61 in the next region 68 to create a larger, continuous volume of contaminated soil 61 or organic liquid/porous matrix mixture 61 through which the combustion front 65 can propagate 66.

In some embodiments, a lower oxidant flow rate is maintained to create a substantially stationary combustion front 65. In some other embodiments, a higher oxidant flow rate is maintained to redistribute the organic liquid volume. Although the previously discussed embodiments show either a low oxidant flow rate or a high oxidant flow rate, these are not intended to limit illustrative embodiments of the invention to a single flow rate. Nor are these examples intended to limit illustrative embodiments of the invention to a consistent or uniform flow rate. Some embodiments of the invention may having changing flow rates, and what started as a low oxidant flow rate may be increased to a high oxidant flow rate, and vice-versa.

In some embodiments, the oxidant supply port 44 (and/or the oxidant source 43) may have alternating oxidant flow rates. For example, a higher oxidant flow rate may be used to reshape the organic liquid volume, and then a lower oxidant flow rate may be used to create a substantially stationary combustion front. Alternatively, or additionally, in some embodiments, the oxidant supply port 44 may use lower oxidant flow rates to create a smaller substantially stationary combustion front while simultaneously using a higher oxidant flow rate to redistribute the organic liquid volume. For example, a higher oxidant flow rate can be used in a direction of discontinuous organic liquid, while simultaneously a smaller oxidant flow rate can be used in a direction of continuous organic liquid. Once the discontinuous section has been joined with the continuous section, a smaller oxidant flow rate can be used to create a substantially stationary combustion front. Alternatively, or additionally, a smaller oxidant flow rate may be used to create a substantially stationary combustion front, and a higher oxidant flow rate may then be used to redistribute the combusted residue.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method for destroying, by smoldering combustion, organic liquid contaminants contained in a plurality of separate below-ground volumes, the method comprising:
   applying heat to at least a portion of a first one of the separate below-ground volumes of organic liquid contaminants and forcing oxidant into the first separate below-ground volume of organic liquid contaminants so as to initiate self-sustaining smoldering combustion of the first separate below-ground volume of organic liquid contaminants;
   terminating the heat applied to the first separate below-ground volume of organic liquid contaminants; and
   modulating flow of the oxidant into the first separate below-ground volume of organic liquid contaminants so as to cause at least a portion of the first separate below-ground volume of organic liquid contaminants to migrate and come into contact with another separate below-ground volume of organic liquid contaminants, so as to form a continuous volume of organic liquid contaminants and to propagate the smoldering combustion through the continuous volume of organic liquid.

2. The method according to claim 1, further comprising causing propagation of the smoldering combustion away from a point of ignition of the combustion.

3. The method according to claim 1, wherein ground is natural or made ground.

4. The method according to claim 1, wherein forcing the oxidant through the first separate below-ground volume of organic liquid contaminants includes injecting air into the first separate below-ground volume of organic liquid contaminants through an injection port.

5. A method of combining organic liquid contaminants, contained in a plurality of separate below-ground volumes, for destruction, the method comprising:
   locating a first one of the separate below-ground volumes of organic liquid contaminants;
   forcing oxidant into the ground so as to cause the first separate below-ground volume of organic liquid contaminants to migrate away from a point of oxidant injection;
   forming a combined volume of organic liquid contaminants by contacting the first separate below-ground volume of organic liquid contaminants with a second separate below-ground volume of organic liquid contaminants;
   applying heat to at least a portion of the combined volume of organic liquid contaminants; and
   terminating the heat applied to the combined volume of organic liquid contaminants,
   so as to initiate a self-sustaining smoldering combustion reaction of the combined volume of organic liquid contaminants.

6. The method according to claim 5, further comprising:
   causing propagation of the smoldering combustion reaction away from the point of oxidant injection.

7. The method according to claim 5, further comprising:
   modulating flow of the oxidant into the combined volume of organic liquid contaminants in a manner to establish a substantially stationary combustion front, by causing destruction of the organic liquid contaminants to occur at a rate approximating a rate of influx of the organic liquid contaminants into the smoldering combustion.

8. The method according to claim 5, wherein initiating the smoldering combustion reaction includes applying heat to the combined volume of organic liquid contaminants from a convective heating source coupled to ground.

9. The method according to claim 5, wherein ground is natural or made ground.

10. The method according to claim 5, wherein forcing the oxidant in the ground includes injecting air in the ground through an injection port.

* * * * *